United States Patent
Kim

(10) Patent No.: US 6,850,346 B2
(45) Date of Patent: Feb. 1, 2005

(54) METHOD AND APPARATUS FOR STORING AND RETRIEVING A SEQUENCE OF DIGITAL PAGE DATA

(75) Inventor: Kun Yul Kim, Seoul (KR)

(73) Assignee: Daewoo Electronics Corporation (KR)

( * ) Notice: Subject to any disclaimer, the term of this patent is extended or adjusted under 35 U.S.C. 154(b) by 0 days.

(21) Appl. No.: 10/460,450

(22) Filed: Jun. 11, 2003

(65) Prior Publication Data

US 2004/0085600 A1 May 6, 2004

(30) Foreign Application Priority Data

Nov. 5, 2002 (KR) ................................ 10-2002-0068117

(51) Int. Cl.[7] ................................................ G03H 1/04
(52) U.S. Cl. .............................. 359/35; 359/10; 359/11; 359/3; 359/22; 359/1
(58) Field of Search ........................... 359/35, 1, 3, 10, 359/11, 22, 24, 7

(56) References Cited

U.S. PATENT DOCUMENTS

| | | | | | |
|---|---|---|---|---|---|
| 5,777,760 | A | * | 7/1998 | Hays et al. ..................... | 359/7 |
| 5,835,470 | A | * | 11/1998 | Campbell et al. ........... | 369/103 |
| 5,943,145 | A | * | 8/1999 | Curtis et al. .................. | 359/22 |
| 6,512,385 | B1 | * | 1/2003 | Pfaff et al. .................. | 324/753 |
| 6,697,180 | B1 | * | 2/2004 | Wilson et al. ................ | 359/11 |
| 2003/0189741 | A1 | * | 10/2003 | Kang .......................... | 359/35 |

* cited by examiner

Primary Examiner—Fayez Assaf
(74) Attorney, Agent, or Firm—Anderson Kill & Olick, PC

(57) ABSTRACT

In a storing mode of an apparatus for storing and retrieving a sequence of digital page data, a first/second complex reference beam and a modulated signal beam converge on a storing location to generate a sequence of first/second interference patterns to be sequentially stored on a holographic medium. A shift selectivity of the first complex reference beam is larger than that of the second complex reference beam so that the second interference pattern is used as a servo pattern to sequentially determine where the first interference patterns have been stored.

17 Claims, 4 Drawing Sheets

METHOD AND APPARATUS FOR STORING AND RETRIEVING A SEQUENCE OF DIGITAL PAGE DATA

FIELD OF THE INVENTION

The present invention relates to a holographic digital data storage system; and, more particularly, to a method and apparatus for storing and retrieving a sequence of digital page data by using two complex reference beams of a wavelength whose selectivities are different from each other.

BACKGROUND OF THE INVENTION

Responding to ever increasing demands for an optical storage system that can store a large amount of data, such as data for a motion picture film, various types of holographic digital data storage systems incorporating therein a holographic medium made of a photo-refractive crystal such as lithium niobate or the like have been recently developed for realizing high density optical storage capabilities.

The holographic digital data storage system allows a modulated signal beam having information therein to coherently interfere with a reference beam to generate an interference pattern therebetween and, then, controls the interference pattern to be stored as index perturbations (holograms) in a specific recording location of the holographic medium such as a photo-refractive crystal, wherein the photo-refractive crystal is a material which may react differently on interference patterns depending on the respective amplitudes and phases thereof.

To realize high density storage capabilities, many schemes for hologram multiplexing have been suggested, such as angular multiplexing, wavelength multiplexing, shift multiplexing and phase code multiplexing. Recently, a correlation multiplexing has received considerable attention for its sharp spatial shift selectivity, wherein the correlation multiplexing employs a random pattern (RP) referencing scheme, a speckle pattern referencing scheme or a complex referencing scheme in which a quasi-random-phased speckle wave front is used as a reference beam. Large numbers of holograms may therefore be multiplexed in essentially a same volume of the holographic medium through only a micron-size spatial translation of the holographic medium relative to the reference beam.

Referring to FIG. 1, there is shown a block diagram for illustrating a conventional holographic digital data storage system multiplexed by using a correlation multiplexing. The conventional holographic digital data storage system includes a laser 100, a beam splitter 101, a first and a second mirror 102 and 104, a spatial light modulator (SLM) 105, a diffuser 108, a holographic medium 110, a shutter 111, a linear stage 112 and a charge coupled device (CCD) 120.

In a storing mode, a coherent monochromatic beam, e.g., a laser beam emitted from the laser 100, impinges onto the beam splitter 101. The beam splitter 101 splits the laser beam into a reference beam R and a signal beam S. The reference beam R is a portion of the laser beam transmitted through the beam splitter 101 and the signal beam S is a remaining portion of the laser beam reflected from the beam splitter 101. After being reflected by the first mirror 102, the reference beam enters into the diffuser 108. The diffuser 108 transforms the reference beam into a complex reference beam $R_D$ for a correlation multiplexing.

In the meantime, the signal beam S is reflected by the second mirror 104 and, then, enters into the SLM 105. Since a sequence of digital page data is sequentially provided to the SLM 105, the signal beam S is sequentially modulated with the digital page data to generate a modulated signal beam SM.

The modulated signal beam $S_M$ and the complex reference beam $R_D$ converge on the holographic medium 110 to generate a sequence of interference patterns to be sequentially stored in the holographic medium 110.

To read out the stored data, a retrieving reference beam with characteristics matching with those of the reference beam used during the storing mode must be illuminated precisely to a specific storing location of the holographic medium and diffracts off the stored index perturbations to reconstruct a reconstructed signal beam corresponding to the modulated signal beam.

Specifically, in a retrieving mode, the shutter 111 located along a path of the signal beam turns to be closed so that only a retrieving reference beam R may be obtained from the coherent monochromatic beam, wherein the retrieving reference beam R of the retrieving mode is substantially same as the reference beam R of the storing mode.

After being reflected by the first mirror 102, the retrieving reference beam enters into the diffuser 108. The diffuser 108 transforms the retrieving reference beam into a complex retrieving reference beam $R_D$. Therefore, the complex retrieving reference beam is substantially same as the complex reference beam in the storing mode.

The complex retrieving reference beams $R_D$ is illuminated on the holographic medium 110 in which the interference patterns have been sequentially stored, to sequentially reconstruct a reconstructed signal beam. The reconstructed signal beam is substantially a diffracted beam which is generated from the interference patterns through the irradiation of the complex retrieving reference beams $R_D$ into the holographic medium 110. The reconstructed signal beam is captured with a predetermined interval to sequentially recover the digital page data.

Usually, a high-precise linear stage on which the holographic medium is installed has been precisely controlled with the predetermined interval by a DC servo motor, to determine the specific storing location. In other words, after the storing location is detected by using the DC servo motor, the CCD camera may have captured the reconstructed signal beam to read out the digital page data. Since, therefore, the DC servo motor is controlled to sequentially move the high-precise linear stage by a predetermined interval/distance, the storing locations of the digital page data are not precisely detected.

SUMMARY OF THE INVENTION

It is, therefore, a primary object of the present invention to provide a method and apparatus for storing and retrieving a sequence of digital page data by using two complex reference beams of a wavelength so that storing locations may be optically detected by using one of two complex reference beams.

In accordance with a preferred embodiment of the invention, there is provided a method for storing a sequence of digital page data into a holographic medium which moves continuously and linearly, the method comprising the steps of:

splitting a coherent monochromatic beam into a reference beam and a signal beam;

sequentially modulating the signal beam with the digital page data to generate a modulated signal beam;

transforming the reference beam into a first and a second complex reference beam; and converging the modulated signal beam and the first and second complex reference beams on the holographic medium to generate a sequence of first and second interference patterns to be sequentially stored in the holographic medium, wherein a shift selectivity of the first complex reference beam is larger than that of the second complex reference beam so that the second interference patterns are used as servo patterns to sequentially determine where the first interference patterns have been stored, and wherein the shift selectivity of the first and second complex reference beams is a minimum movement of the holographic medium relative to the first and second complex reference beams which causes little correlation between every two neighboring first and second interference patterns.

In accordance with another preferred embodiment of the invention, there is provided method for retrieving the digital page data from the first interference patterns of claim 1, the method comprising the steps of:

obtaining a retrieving reference beam from the coherent monochromatic beam, wherein the retrieving reference beam is substantially same as the reference beam;

modifying the retrieving reference beam into a first and a second complex retrieving reference beam, wherein the first and the second complex retrieving reference beams are substantially same as the first and the second complex reference beams, respectively;

illuminating the first and the second complex retrieving reference beams on the holographic medium in which the first and the second interference patterns have been stored, to sequentially reconstruct a reconstructed signal beam from the first and the second interference patterns, wherein the reconstructed signal beam corresponds to the modified signal beam;

separating the reconstructed signal beam into a first and a second reconstructed signal beam, wherein the first and second reconstructed signal beams correspond to the first and second interference patterns and the shift selectivity of the first and second reconstructed signal beams is substantially same as that of the first and second complex reference beams so that the shift selectivity of the first reconstructed signal beam is larger than that of the second reconstructed signal beam; and sequentially capturing the first reconstructed signal beam based on the second reconstructed signal beam to sequentially recover the digital page data therefrom.

In accordance with another aspect of the invention, there is provided an apparatus for storing and retrieving a sequence of digital page data, the apparatus comprising: a holographic medium, which moves continuously and linearly, for storing the digital page data therein and retrieving the digital page data therefrom;

means for splitting a coherent monochromatic beam into a reference beam and a signal beam;

means for, in a storing mode, sequentially modulating the signal beam with the digital page data to generate a modulated signal beam;

means for, in a retrieving mode, preventing the signal beam from being propagated so that only the reference beam is transmitted as a retrieving reference beam, wherein the retrieving reference beam is substantially same as the reference beam;

means for, in the storing mode, transforming the reference beam into a first and a second complex reference beams and, in the retrieving mode, transforming the retrieving reference beam into a first and a second complex retrieving reference beams, wherein the first and the second complex retrieving reference beams are substantially same as the first and the second complex reference beams, respectively;

means for, in the storing mode, converging the modulated signal beam and the first and second complex reference beams on the holographic medium to generate a sequence of first and second interference patterns to be sequentially stored on the holographic medium, wherein a shift selectivity of the first complex reference beam is larger than that of the second complex reference beam so that the second interference pattern is used as a servo pattern to sequentially determine where the first interference patterns has been stored, and wherein the shift selectivity of the first and second complex reference beams is a minimum movement of the holographic medium relative to the first and second complex reference beams which causes little correlation between every two neighboring first and second interference patterns;

means for, in the retrieving mode, illuminating the first and the second complex retrieving reference beams on the holographic medium in which the first and the second interference patterns have been stored, to sequentially reconstruct a reconstructed signal beam from the first and the second interference patterns, wherein the reconstructed signal beam corresponds to the modified signal beam;

means for separating the reconstructed signal beam into a first and a second reconstructed signal beam, wherein the first and second reconstructed signal beams correspond to the first and second interference patterns and the shift selectivity of the first and second reconstructed signal beams is substantially same as that of the first/second complex reference beam so that the shift selectivity of the first reconstructed signal beam is larger than that of the second reconstructed signal beam; and means for sequentially capturing the first reconstructed signal beam based on the second reconstructed signal beam to sequentially recover the digital page data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
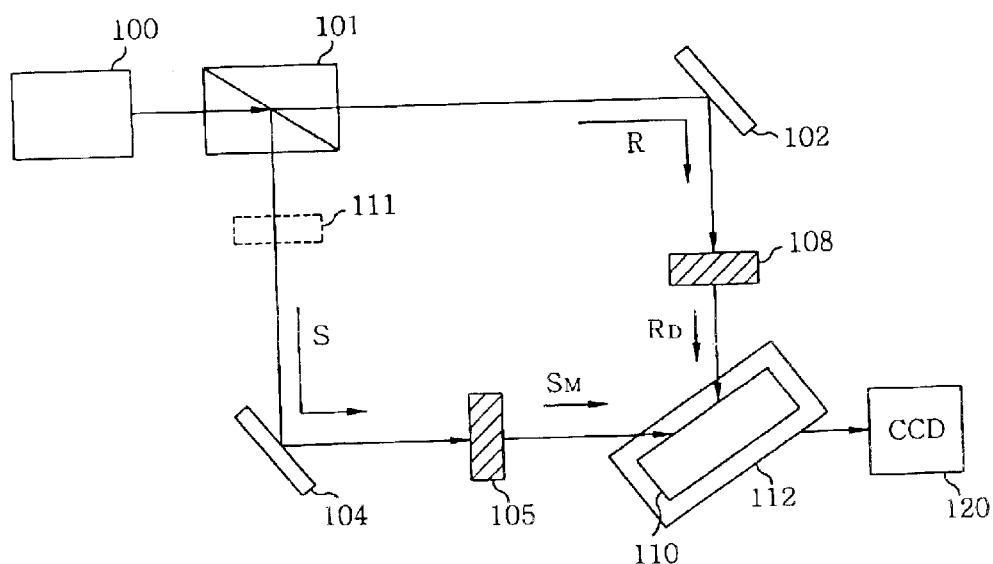
FIG. 1 represents a block diagram for illustrating a conventional holographic digital data storage system multiplexed by using a correlation multiplexing.
Figure 2A:
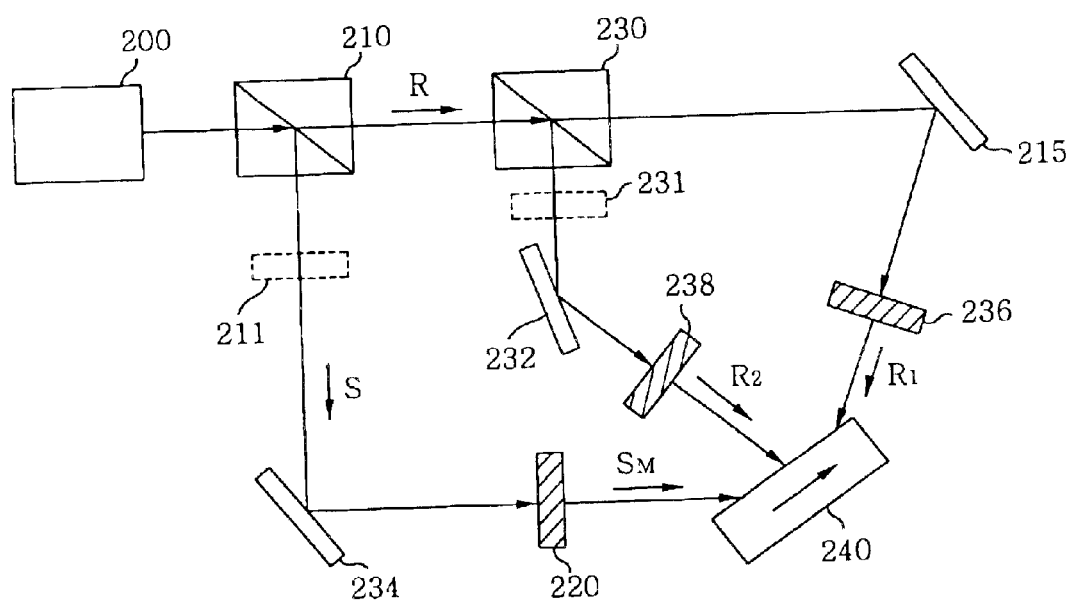
FIG. 2A shows a block diagram for illustrating a storing mode of a holographic digital data storage system in accordance with the present invention.
Figure 2B:
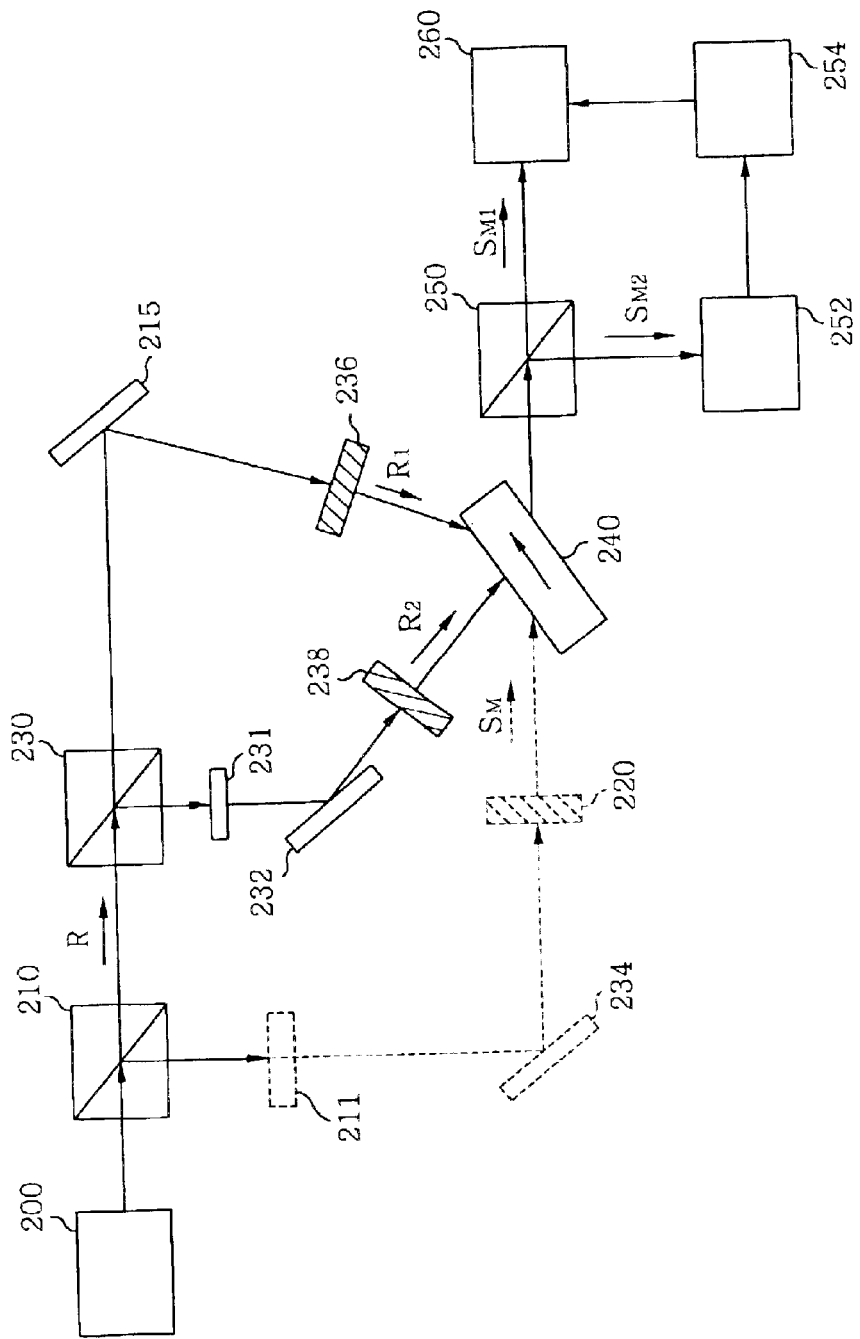
FIG. 2B describes a block diagram for illustrating a retrieving mode of the holographic digital data storage system in accordance with the present invention.

Referring to FIGS. 2A and 2B, there is shown a block diagram for illustrating a holographic digital data storage system in accordance with a preferred embodiment of the present invention. FIG. 2A illustrates a storing mode of the holographic digital data storage system while FIG. 2B illustrates a retrieving mode thereof. The holographic digital data storage system includes a laser 200, a first, a second and a third beam splitter 210, 230 and 250, a shutter 211, a first, a second and a third mirror 215, 232 and 234, a spatial light modulator (SLM) 220, a polarizer 231, a first and a second diffuser 236 and 238, a holographic medium 240, a photodetector 252, a pulse generator 254 and a charge coupled device (CCD) 260. For illustration, it is assumed that the holographic medium 240 having a type of a disk is rotated at a rotational speed such that a storing location of the holographic medium 240 may move continuously and linearly.

In the storing mode shown in FIG. 2A, a coherent monochromatic beam, e.g., a laser beam emitted from the laser 200, impinges onto the first beam splitter 210. The first beam splitter 210 splits the laser beam into a reference beam R and a signal beam S. The reference beam R is a portion of the laser beam transmitted through the first beam splitter 210 and the signal beam S is a remaining portion of the laser beam reflected from the first beam splitter 210.

The second beam splitter 230 divides the reference beam R into a first and a second reference beam. The first reference beam is a portion of the reference beam R transmitted through the second beam splitter 230 and the second reference beam is a remaining portion of the reference beam R reflected from the second beam splitter 230.

After being reflected by the first and the second mirror 215 and 232, the first and the second reference beam enter into the first and the second diffuser 236 and 238, respectively. The first diffuser 236 transforms the first reference beam into a first complex reference beam $R_1$ for a wider correlation multiplexing while the second diffuser 238 transforms the second reference beam into a second complex reference beam R2 for a narrower correlation multiplexing. In other words, a shift selectivity of the first diffuser 236 is larger than that of the second diffuser 238 so that the shift selectivity of the first complex reference beam $R_1$ is larger than that of the second complex reference beam $R_2$. It is preferable that the shift selectivity of first complex reference beam $R_1$ is approximately 2 to 50 times larger than that of the second complex reference beam $R_2$.

Figure 3:
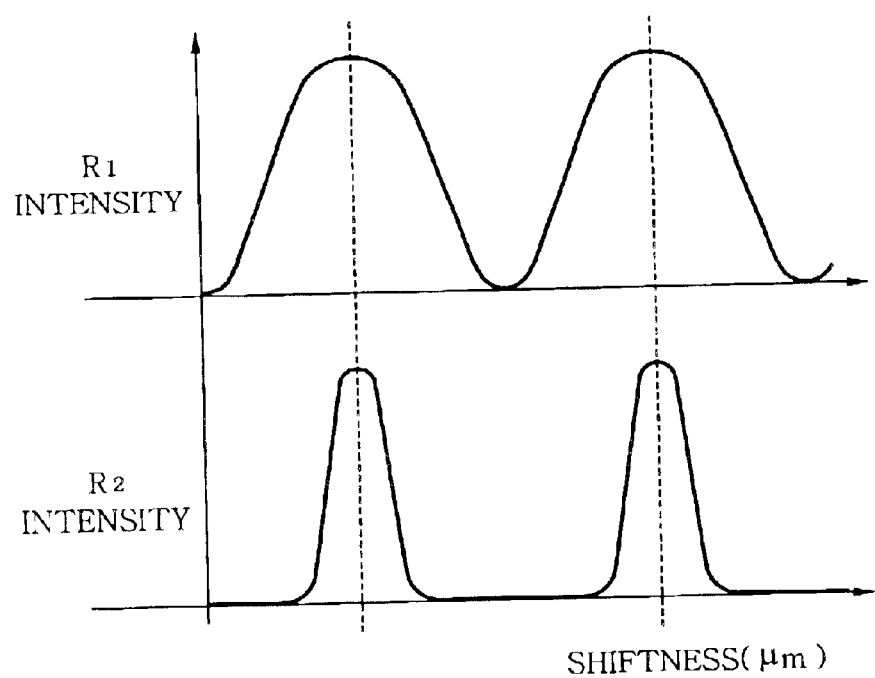
FIG. 3 provides a graph for illustrating a shift selectivity of a first complex reference beam which is larger than that of a second complex reference beam in accordance with the present invention.

Referring to FIG. 3, there is shown a graph for illustrating the shift selectivity of the first complex reference beam $R_1$ which is larger than that of a second complex reference beam $R_2$ in accordance with the present invention. The shift selectivity of the first and second complex reference beams represents a minimum movement of the holographic medium 240 relative to the first and second complex reference beams which causes little correlation between every two neighboring first/second interference patterns as will be described, wherein the first and second interference patterns correspond to the first and second complex reference beams. Therefore, the smaller is the shift selectivity, the more holograms, i.e., holographic interference patterns, may be stored.

Referring back to FIG. 2A, the first and the second complex reference beam is introduced into the holographic medium 240.

In the meantime, the signal beam S is reflected by the third mirror 234 and, then, enters into the SLM 220. Since a sequence of digital page data is sequentially provided to the SLM 220, the signal beam S is sequentially modulated with the digital page data to generate a modulated signal beam $S_M$. The modulated signal beam $S_M$ is modulated with a modulation period, that depends on the larger selectivity, i.e., the selectivity of the first complex reference beam $R_1$. Since the holographic medium 240 with a type of a disk is usually rotated at a predetermined speed v such that the selectivity of the first and second complex reference beams $R_1$ and $R_2$ may be related with the modulation period of the modulated signal beam $S_M$. Specifically the modulation period of the modulated signal beam $S_M$ is same as or larger than an interval that is given by the larger selectivity, i.e., the selectivity of the first complex reference beam $R_1$, divided by the speed v of the holographic medium 240.

The modulated signal beam $S_M$ and the first and second complex reference beams $R_1$ and $R_2$ converge on holographic medium 240 to generate a sequence of first and second interference patterns to be sequentially stored in the holographic medium 240. The modulated signal beam $S_M$ and the first and the second complex reference beams $R_1$ and $R_2$ converge on a location on which the holographic medium 240 is located. The second interference patterns generated by the second complex reference beam $R_2$, the selectivity of which is smaller than that of the first reference beam $R_1$, will be used as servo patterns to sequentially determine where the first interference patterns have been stored. The correlation between the first and the second complex reference beams $R_1$ and $R_2$ is relatively small to be negligible.

In the retrieving mode shown in FIG. 2B, the shutter 211 located along a path of the signal beam turns to be closed so that only a retrieving reference beam R may be obtained from the coherent monochromatic beam, wherein the retrieving reference beam R of the retrieving mode is substantially same as the reference beam R of the storing mode.

The second beam splitter 230 divides the retrieving reference beam R into a first and a second retrieving reference beam, wherein the first and second retrieving reference beams of the retrieving mode are substantially same as the first and second reference beams of the storing mode.

After being reflected by the first and the second mirrors 215 and 232, the first and the second retrieving reference beams enter into the first and the second diffusers 236 and 238, respectively. The first diffuser 236 transforms the first retrieving reference beam into a first complex retrieving reference beam $R_1$ while the second diffuser 238 transforms the second retrieving reference beam into a second complex retrieving reference beam $R_2$. Therefore, the first and second complex retrieving reference beams are substantially same as the first and second complex reference beams in the storing mode. Since the shift selectivity of the first diffuser 236 is larger than that of the second diffuser 238, the shift selectivity of the first complex retrieving reference beam $R_1$ is larger than that of the second complex retrieving reference beam $R_2$.

In the retrieving mode, it is preferable that one of the first and the second retrieving reference beams is vertically polarized so that the first and the second complex retrieving reference beams $R_1$ and $R_2$ are vertically polarized with each other. For example, in FIG. 2B, the polarizer 231 is used to vertically polarize the second retrieving reference beam. It is natural that the second complex retrieving reference beam $R_2$ is vertically polarized as shown in FIG. 2B.

The first and the second complex retrieving reference beams $R_1$ and $R_2$ are illuminated on the holographic medium 240 in which the first and the second interference patterns have been sequentially stored, to sequentially reconstruct a reconstructed signal beam. The reconstructed signal beam is substantially a diffracted beam which is generated from the first and the second interference patterns through the irradiation of the first and the second complex retrieving reference beams $R_1$ and $R_2$ into the holographic medium 240.

The reconstructed signal beam enters into the third beam splitter 250, which separates the reconstructed signal beam into a first and a second reconstructed signal beam $S_{M1}$ and $S_{M2}$. The first and second reconstructed signal beams correspond to the first and second interference patterns stored by the first and second complex retrieving reference beams. Since the second complex retrieving reference beam $R_2$ is vertically polarized, the first reconstructed signal beam $S_{M1}$ is a portion of the reconstructed signal beam transmitted through the third beam splitter 250 and the second retrieving signal beam $S_{M2}$ is a remaining portion of the reconstructed signal beam reflected from the third beam splitter 250.

Then, the first reconstructed signal beam $S_{M1}$ is captured based on the second reconstructed signal beam $S_{M2}$ such that the digital page data are sequentially recovered, wherein the shift selectivity of the first reconstructed signal beam $S_{M1}$ is larger than that of the second reconstructed signal beam $S_{M2}$. Specifically, the photodetector 252 continuously detects the second reconstructed signal beam $S_{M2}$ and the pulse generator 254 determines whether or not an intensity of the second reconstructed signal beam $S_{M2}$ is larger than a predetermined threshold. If the intensity of the second reconstructed signal beam $S_{M2}$ is larger than the predetermined threshold, the pulse generator 254 generates a trigger signal to control the CCD 260. It is preferable that the trigger signal is a pulse which is periodically activated with the modulation period of the modulated signal beam $S_M$. Whenever the trigger signal is periodically activated, the CCD 260 sequentially captures the first reconstructed signal beam $S_{M1}$ to sequentially recover the digital page data.

While the invention has been shown and described with respect to the preferred embodiments, it will be understood by those skilled in the art that various changes and modifications may be made without departing from the spirit and scope of the invention as defined in the following claims.

What is claimed is:

1. A method for storing a sequence of digital page data into a holographic medium which moves continuously and linearly, the method comprising the steps of:

splitting a coherent monochromatic beam into a reference beam and a signal beam;

sequentially modulating the signal beam with the digital page data to generate a modulated signal beam;

transforming the reference beam into a first and a second complex reference beam; and converging the modulated signal beam and the first and the second complex reference beams on the holographic medium to generate a sequence of first and second interference patterns to be sequentially stored in the holographic medium, respectively, wherein a shift selectivity of the first complex reference beam is larger than that of the second complex reference beam so that the second interference patterns are used as servo patterns to sequentially determine where the first interference patterns have been stored, and wherein the shift selectivities of the first and the second complex reference beams are minimum movements of the holographic medium relative to the first and the second complex reference beams which cause little correlations between every two neighboring first and second interference patterns, respectively.

2. The method of claim 1, wherein the modulated signal beam, the first complex reference beam and the second complex reference beam converge on a location on which the holographic medium is located.

3. The method of claim 1, wherein said transforming step includes the steps of:

dividing the reference beam into a first and a second reference beam; and changing the first and the second reference beams into the first and the second complex reference beams by using a first and a second diffuser, respectively, wherein the shift selectivity of the first diffuser is larger than that of the second diffuser.

4. The method of claim 1, wherein the shift selectivity of the first complex reference beam is approximately 2 to 50 times larger than that of the second complex reference beam.

5. A method for retrieving the digital page data from the first interference patterns of claim 1, the method comprising the steps of:

obtaining a retrieving reference beam from the coherent monochromatic beam, wherein the retrieving reference beam is substantially same as the reference beam;

modifying the retrieving reference beam into a first and a second complex retrieving reference beam, wherein the first and the second complex retrieving reference beams are substantially same as the first and the second complex reference beams, respectively;

illuminating the first and the second complex retrieving reference beams on the holographic medium in which the first and the second interference patterns have been stored, to sequentially reconstruct a reconstructed signal beam from the first and the second interference patterns, wherein the reconstructed signal beam corresponds to the modified signal beam;

separating the reconstructed signal beam into a first and a second reconstructed signal beam, wherein the first and the second reconstructed signal beams correspond to the first and the second interference patterns, respectively, and the shift selectivities of the first and the second reconstructed signal beams are is substantially same as those of the first and the second complex reference beams, respectively, so that the shift selectivity of the first reconstructed signal beam is larger than that of the second reconstructed signal beam; and sequentially capturing the first reconstructed signal beam based on the second reconstructed signal beam to sequentially recover the digital page data therefrom.

6. The method of claim 5, wherein the first and the second complex retrieving reference beams are vertically polarized with each other.

7. The method of claim 5, wherein the modifying step includes the steps of:

dividing the retrieving reference beam into a first and a second retrieving reference beam; and changing the first and the second retrieving reference beams into the first and the second complex retrieving reference beams by using a first and a second diffuser, respectively, wherein the shift selectivity of the first diffuser is larger than that of the second diffuser.

8. The method of claim 5, wherein said capturing step includes the steps of:

generating a trigger signal from the second reconstructed signal beam; and sequentially capturing the first reconstructed signal beam based on the trigger signal to sequentially recover the digital page data therefrom.

9. The method of claim 8, wherein said generating step has the steps of:

determining whether or not an intensity of the second reconstructed signal beam is larger than a predetermined threshold; and creating, if the intensity of the second reconstructed signal beam is larger than the predetermined threshold, the trigger signal.

10. The method of claim 5, wherein the shift selectivity of the first complex retrieving reference beam is approximately 2 to 50 times larger than that of the second complex retrieving reference beam.

11. An apparatus for storing and retrieving a sequence of digital page data, the apparatus comprising:

a holographic medium, which moves continuously and linearly, for storing the digital page data therein and retrieving the digital page data therefrom;

means for splitting a coherent monochromatic beam into a reference beam and a signal beam;

means for, in a storing mode, sequentially modulating the signal beam with the digital page data to generate a modulated signal beam;

means for, in a retrieving mode, preventing the signal beam from being propagated so that only the reference beam is transmitted as a retrieving reference beam, wherein the retrieving reference beam is substantially same as the reference beam;

means for, in the storing mode, transforming the reference beam into a first and a second complex reference beams and, in the retrieving mode, transforming the retrieving reference beam into a first and a second complex retrieving reference beams, wherein the first and the second complex retrieving reference beams are substantially same as the first and the second complex reference beams, respectively;

means for, in the storing mode, converging the modulated signal beam and the first and the second complex reference beams on the holographic medium to generate a sequence of first and second interference patterns to be sequentially stored on the holographic medium, respectively, wherein a shift selectivity of the first complex reference beam is larger than that of the second complex reference beam so that the second interference pattern is used as a servo pattern to sequentially determine where the first interference patterns has been stored, and wherein the shift selectivities of the first and the second complex reference beams are minimum movements of the holographic medium relative to the first and the second complex reference beams which cause little correlations between every two neighboring first and second interference patterns, respectively;

means for, in the retrieving mode, illuminating the first and the second complex retrieving reference beams on the holographic medium in which the first and the second interference patterns have been stored, to sequentially reconstruct a reconstructed signal beam from the first and the second interference patterns, wherein the reconstructed signal beam corresponds to the modified signal beam;

means for separating the reconstructed signal beam into a first and a second reconstructed signal beam, wherein the first and the second reconstructed signal beams correspond to the first and the second interference patterns, respectively, and the shift selectivities of the first and the second reconstructed signal beams are is substantially same as those of the first and the second complex reference beams, respectively, so that the shift selectivity of the first reconstructed signal beam is larger than that of the second reconstructed signal beam; and means for sequentially capturing the first reconstructed signal beam based on the second reconstructed signal beam to sequentially recover the digital page data.

12. The apparatus of claim 11, further comprising means for, in the retrieving mode, vertically polarizing one of the first and the second complex retrieving reference beams so that the first and the second complex retrieving reference beams are vertically polarized with each other.

13. The apparatus of claim 11, wherein the modulated signal beam and the first and the second complex reference beams converge on a location on which the holographic medium is located.

14. The apparatus of claim 11, wherein said transforming means includes:

means for, in the storing mode, dividing the reference beam into a first and a second reference beam and, in the retrieving mode, dividing the retrieving reference beam into a first and a second retrieving reference beam;

means for, in the storing mode, changing the first reference beam into the first complex reference beam and, in the retrieving mode, changing the first retrieving reference beam into the first complex retrieving reference beam; and means for, in the storing mode, altering the second reference beam into the second complex reference beam and, in the retrieving mode, altering the second retrieving reference beam into the second complex retrieving reference beam, wherein the shift selectivity of said changing means is larger than that of said altering means.

15. The apparatus of claim 11, wherein the shift selectivity of the first complex reference beam is approximately 2 to 50 times larger than that of the second complex reference beam and the shift selectivity of the first complex retrieving reference beam is approximately 2 to 50 times larger than that of the second complex retrieving reference beam.

16. The apparatus of claim 11, wherein said capturing means includes:

means for generating a trigger signal from the second reconstructed signal beam; and means for sequentially capturing the first reconstructed signal beam based on the trigger signal to sequentially recover the digital page data therefrom.

17. The apparatus of claim 16, wherein said generating means has:

means for determining whether or not an intensity of the second reconstructed signal beam is larger than a predetermined threshold; and means for creating, if the intensity of the second reconstructed signal beam is larger than the predetermined threshold, the trigger signal.

* * * * *